(12) United States Patent
Simons

(10) Patent No.: US 7,748,761 B2
(45) Date of Patent: Jul. 6, 2010

(54) GRIPPING DEVICE FOR A ROBOT OR A GANTRY LOADER

(75) Inventor: Marcus Simons, Simmerath (DE)

(73) Assignee: Durr Ecoclean GmbH, Stuttgart (DE)

( * ) Notice: Subject to any disclaimer, the term of this patent is extended or adjusted under 35 U.S.C. 154(b) by 0 days.

(21) Appl. No.: 12/121,585

(22) Filed: May 15, 2008

(65) Prior Publication Data

US 2008/0265598 A1    Oct. 30, 2008

Related U.S. Application Data

(63) Continuation of application No. PCT/EP2006/011036, filed on Nov. 17, 2006.

(30) Foreign Application Priority Data

Dec. 7, 2005    (DE) ...................... 10 2005 058 312

(51) Int. Cl.
*B25J 15/00* (2006.01)

(52) U.S. Cl. .................. 294/88; 294/2; 294/119.1; 901/37

(58) Field of Classification Search .................. 294/88, 294/119.1, 2, 907; 901/32–39
See application file for complete search history.

(56) References Cited

U.S. PATENT DOCUMENTS

| 4,865,375 A | 9/1989 | Laub et al. | |
| 5,163,729 A | 11/1992 | Borcea et al. | |
| 5,529,359 A * | 6/1996 | Borcea et al. | 294/119.1 |
| 5,595,413 A * | 1/1997 | McGeachy et al. | 294/119.1 |
| 5,620,223 A | 4/1997 | Mills | |
| 6,334,641 B1 * | 1/2002 | Oh | 294/119.1 |
| 6,598,918 B1 * | 7/2003 | Null et al. | 294/119.1 |

FOREIGN PATENT DOCUMENTS

| DE | 689 08 278 T2 | 2/1994 |
| EP | 1 293 307 A2 | 3/2003 |
| EP | 1 080 851 B1 | 6/2005 |
| JP | 63-134133 A | 6/1988 |

* cited by examiner

*Primary Examiner*—Paul T Chin
(74) *Attorney, Agent, or Firm*—Leydig, Voit & Mayer, Ltd.

(57) ABSTRACT

In order to produce a gripping device for a robot or for a gantry loader that can be employed in a flexible manner, it is proposed that the gripping device should comprise at least one linearly displaceable gripping jaw and at least one pivotal gripping connection. The gripping jaw may be linearly displaced along a longitudinal axis of the gripping device by means of a linear drive to grip and release a workpiece. The pivotal gripping connection can be pivotably rotated along a pivotal axis to likewise grip and release a workpiece. In an embodiment, the pivotable gripping connection can be arranged in a plurality of different positions with respect to the housing of the gripping device so that a plurality of different gripping orientations can be achieved.

16 Claims, 17 Drawing Sheets

GRIPPING DEVICE FOR A ROBOT OR A GANTRY LOADER

RELATED APPLICATION

This application is a continuation application of PCT/EP2006/011036 filed Nov. 17, 2006, the entire specification of which is incorporated herein by reference.

FIELD OF DISCLOSURE

The present invention relates to a gripping device for a robot or a gantry loader.

BACKGROUND

The known gripping devices for robots are specially designed and manufactured for each application and for this reason re-jigging or setting up for a workpiece of completely new geometry involves very high expenditure which leads to high procurement costs and long delivery times for such gripping devices.

SUMMARY OF THE INVENTION

The object of the present invention is to create a gripping device for a robot or for a gantry loader which is employable in a flexible manner.

In accordance with the invention, this object is achieved by a gripping device for a robot or a gantry loader which comprises at least one linearly displaceable gripping jaw and at least one pivotal gripping connection.

Due to the linearly displaceable gripping jaw, the gripping device is able to grip a workpiece by means of a gripping element that is arranged on the gripping jaw and is therefore linearly displaceable.

Due to the pivotal gripping connection, the gripping device is able to grip a workpiece by means of a gripping element arranged on the gripping connection in the course of a pivotal movement directly, or, by means of a mechanical reorientation.

Since both types of movement are already integrated into the gripping device and it is merely the gripping elements which come into contact with the work piece that have to be moved over from the gripping jaw to the gripping connection or moved in the reverse direction in order to reset the workpiece gripping movement from a linear movement into a pivotal movement or else from a pivotal movement into a linear movement, the gripping device in accordance with the invention is easily modifiable and employable in a particularly flexible manner.

The gripping device in accordance with the invention preferably comprises a linear drive for the at least one linearly displaceable gripping jaw.

Such a linear drive can comprise, in particular, at least one linearly displaceable actuating rod which engages the linearly displaceable gripping jaw.

Furthermore, the linear drive can comprise at least one drive piston which is displaceable in a drive cylinder by the effect of a hydraulic or pneumatic pressure.

In order to obtain a particularly precise straight-line motion for the linear movement of the gripping jaw, provision may be made for the linear drive to comprise at least one guide rod for controlling the linear movement of the linearly displaceable gripping jaw.

If the gripping device has at least two linearly displaceable gripping jaws, then it preferably also comprises a synchronisation member for synchronizing the linear movement of the linearly displaceable gripping jaws. In this way, both linearly displaceable gripping jaws are displaced in exact synchronism from the open position into the closed position or in the reverse direction.

Furthermore, the gripping device preferably comprises a pivotal drive for the at least one pivotal gripping connection.

In principle, provision may be made for the pivotal drive to be a drive that is formed separately from the linear drive for the linear movement of the linearly displaceable gripping jaw and one that is operated independently of the linear drive.

However, a particularly simple construction for the gripping device in accordance with the invention is obtained if the pivotal drive comprises at least one movement converting device which converts the linear movement of the at least one linearly displaceable gripping jaw into a pivotal movement of the at least one pivotal gripping connection about a pivotal axis. Thus, in this embodiment of the invention, the pivotal drive does not work independently of the linear drive of the gripping device, but rather, it derives its pivotal movement from the linear movement of the linearly displaceable gripping jaw. Thus, the already existing linear drive can also be used for producing the pivotal movement of the gripping connection.

In a preferred embodiment of the invention, provision is made for the movement converting device to be connected to the linearly displaceable gripping jaw.

In particular, provision may be made for the movement converting device to be connected to the linearly displaceable gripping jaw in releasable manner.

In a particularly preferred embodiment of the invention, provision is made for the movement converting device to be capable of being selectively arranged in at least one first position and in at least one second position relative to the linearly displaceable gripping jaw, whereby, in the second position of the movement converting device, the direction of the pivotal axis about which the pivotal gripping connection is pivoted by means of the movement converting device is rotated with respect to the direction of the pivotal axis in the first position of the movement converting device. In this way, it is possible to use the gripping connection in two different positions relative to the linearly displaceable gripping jaw; for example, the pivotal gripping connection can be arranged in a first position on a front wall of the gripping device and in a second position on a bottom wall of the gripping device.

Preferably, provision is made for the direction of the pivotal axis in the second position of the movement converting device to be rotated through an angle of approximately 90° with respect to the direction of the pivotal axis in the first position of the movement converting device.

In regard to the construction of the movement converting device, more detailed information has not as yet been given.

Thus, for example, provision can be made for the movement converting device to comprise a connection rod.

Furthermore, the movement converting device can comprise an eccentric cam.

Advantageously furthermore, provision is made for the movement converting device to comprise an articulated bearing for the pivotal gripping connection.

In a preferred embodiment of the gripping device in accordance with the invention, provision is made for the pivotal gripping connection to be capable of being arranged in at least one first position and in at least one second position relative to a housing of the gripping device. As already explained, the pivotal gripping connection can, for example, be arranged in a first position on a front wall of the housing and in a second position on a bottom wall of the housing.

In order to enable this flexible arrangement of the pivotal gripping connection on the housing of the gripping device, it is of advantage if the housing of the gripping device has a first through opening for the passage of the pivotal gripping connection in the first position and a second through opening for the passage of the pivotal gripping connection in the second position.

In this case furthermore, it is expedient for the gripping device to comprise a cover for closing the first through opening or the second through opening when the pivotal gripping connection is arranged at the second through opening or at the first through opening respectively. In this way, it is ensured that no contamination or foreign body can enter the interior of the housing from the outside through a not used opening in the housing.

The gripping device in accordance with the invention enables the gripping principle to be completely altered by means of small constructional changes and simple conversion measures.

If, for example, in the delivery state of the gripping device, the workpieces were gripped and transported by a linear gripping movement, then the workpieces can be gripped and fixed by being pivoted in or out after a simple alteration of the gripping device.

The gripping device in accordance with the invention is suitable, in particular, for employment in robotic applications in an industrial cleaning plant.

Further features and advantages of the invention form the subject matter of the following description and the graphical illustration of an exemplary embodiment.

BRIEF DESCRIPTION OF THE DRAWINGS

Similar or functionally equivalent elements are designated by the same reference symbols in each of the Figures.

DETAILED DESCRIPTION OF THE INVENTION

Figure 1:
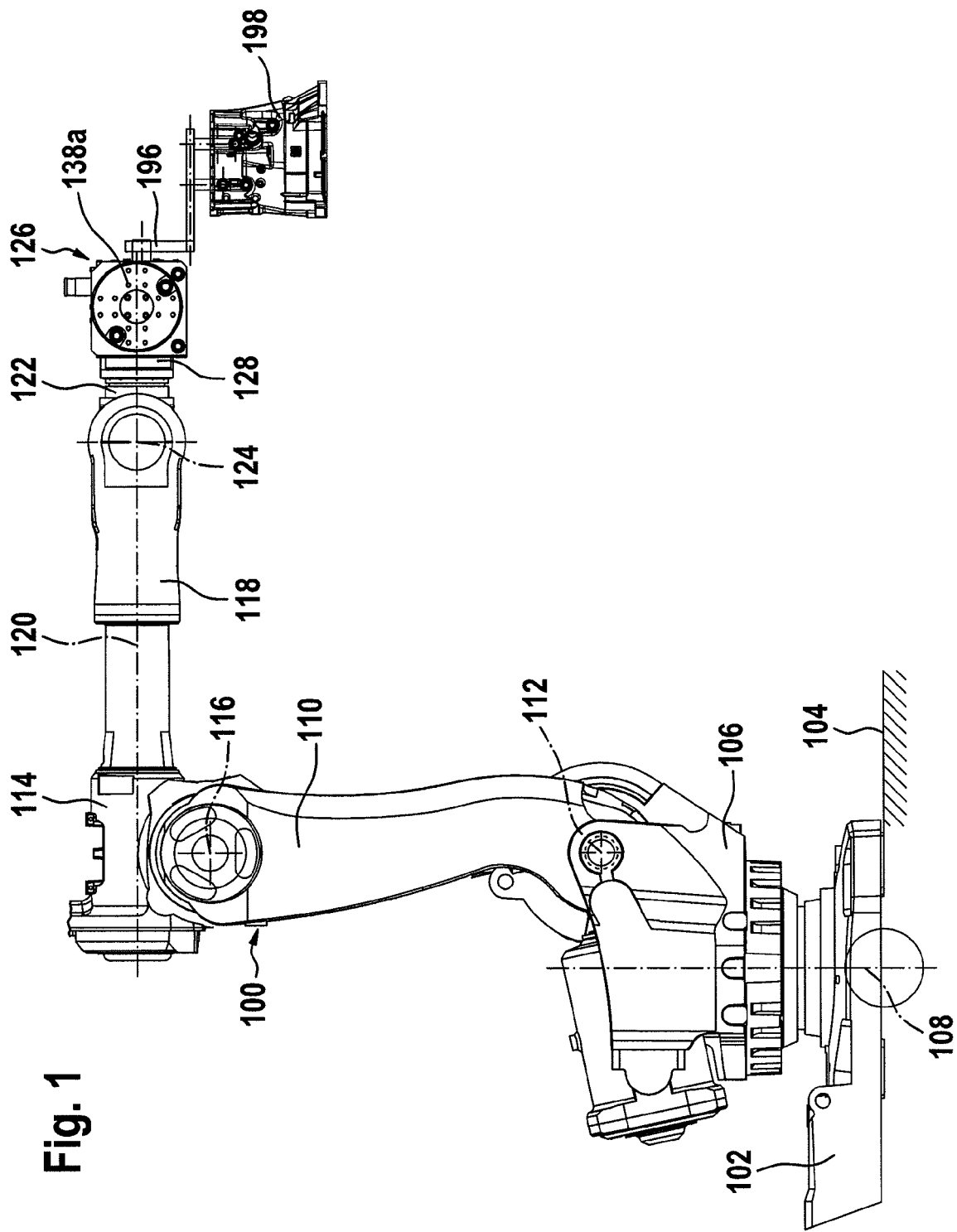
FIG. 1 shows a schematic side view of a robot with a gripping device incorporating linearly displaceable gripping elements on which a workpiece is held.
Figure 2:
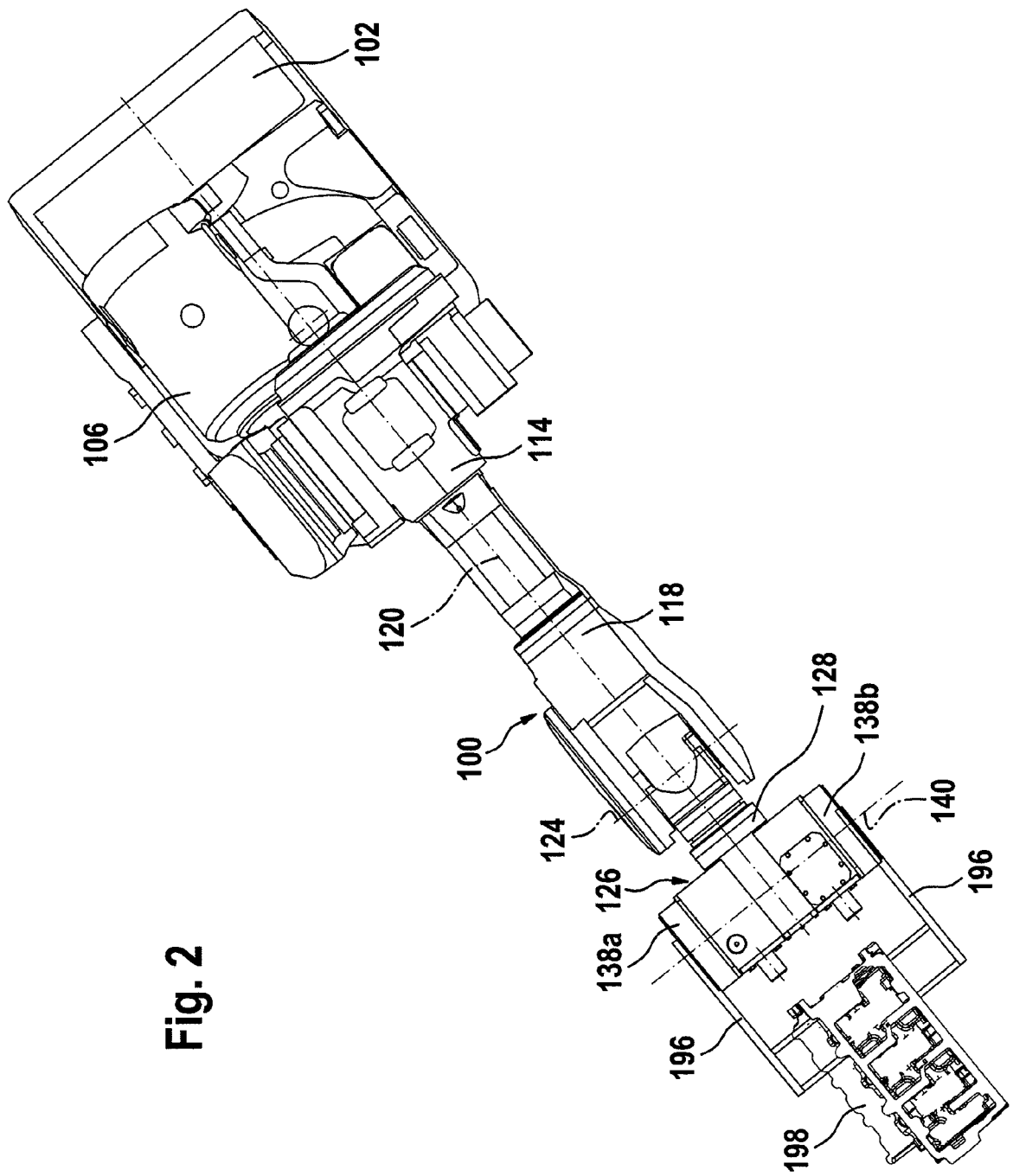
FIG. 2 a schematic plan view from above of the robot with a workpiece depicted in FIG. 1.
Figure 3:
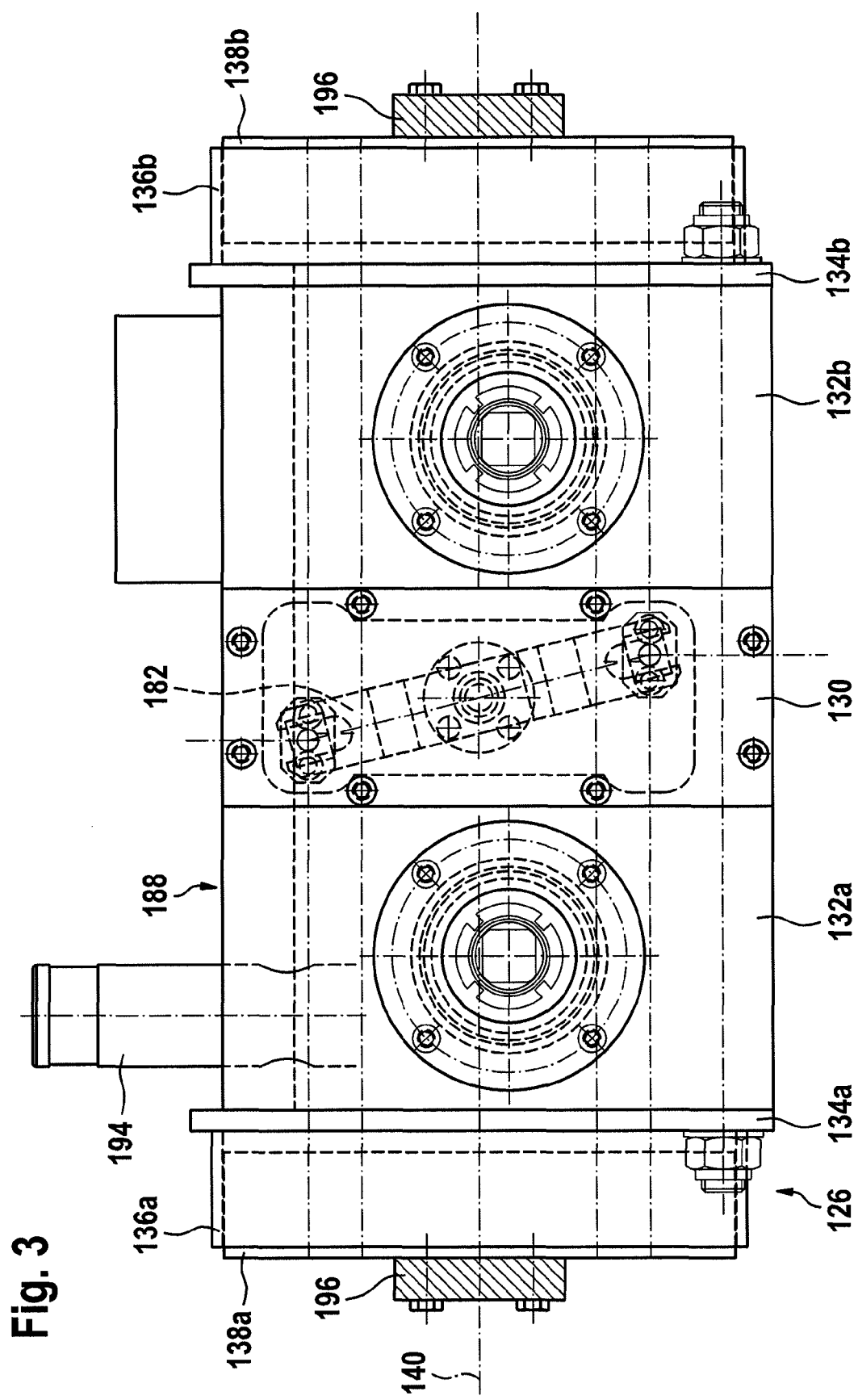
FIG. 3 a schematic front view of the gripping device of the robot depicted in FIGS. 1 and 2, wherein the linearly displaceable gripping jaws of the gripping device are in a closed position.

A robot bearing the general reference 100 and illustrated in FIGS. 1 and 2 comprises a plinth 102 with the aid of which the robot 100 is fixed to a foundation 104, and a base member 106 which is rotatable relative to the plinth 102 about a vertical rotational axis 108 by means of a rotary drive.

A first pivotal member 110 of the robot 100 is held on the base member 106 such as to be pivotal about a horizontal first pivotal axis 112 by means of a pivotal drive.

At the end of the first pivotal member 110 remote from the base member 106, a second pivotal member 114 is held on the first pivotal member 110 such as to be pivotal about a horizontal second pivotal axis 116 by means of a further pivotal drive.

A rotary member 118 is held on the second pivotal member 114 such as to be rotatable about its longitudinal axis serving as a second rotational axis 120 by means of a rotary drive.

A third pivotal member 122 is held on the end of the rotary member 118 remote from the second pivotal member 114 such as to be pivotal about a third pivotal axis 124 running perpendicularly to the second rotational axis 120.

A gripping device 126 bearing the general reference 126 and illustrated in FIGS. 3 to 17 is flange mounted on the free end of the third pivotal member 122 by means of a connection flange 128.

Figure 5:
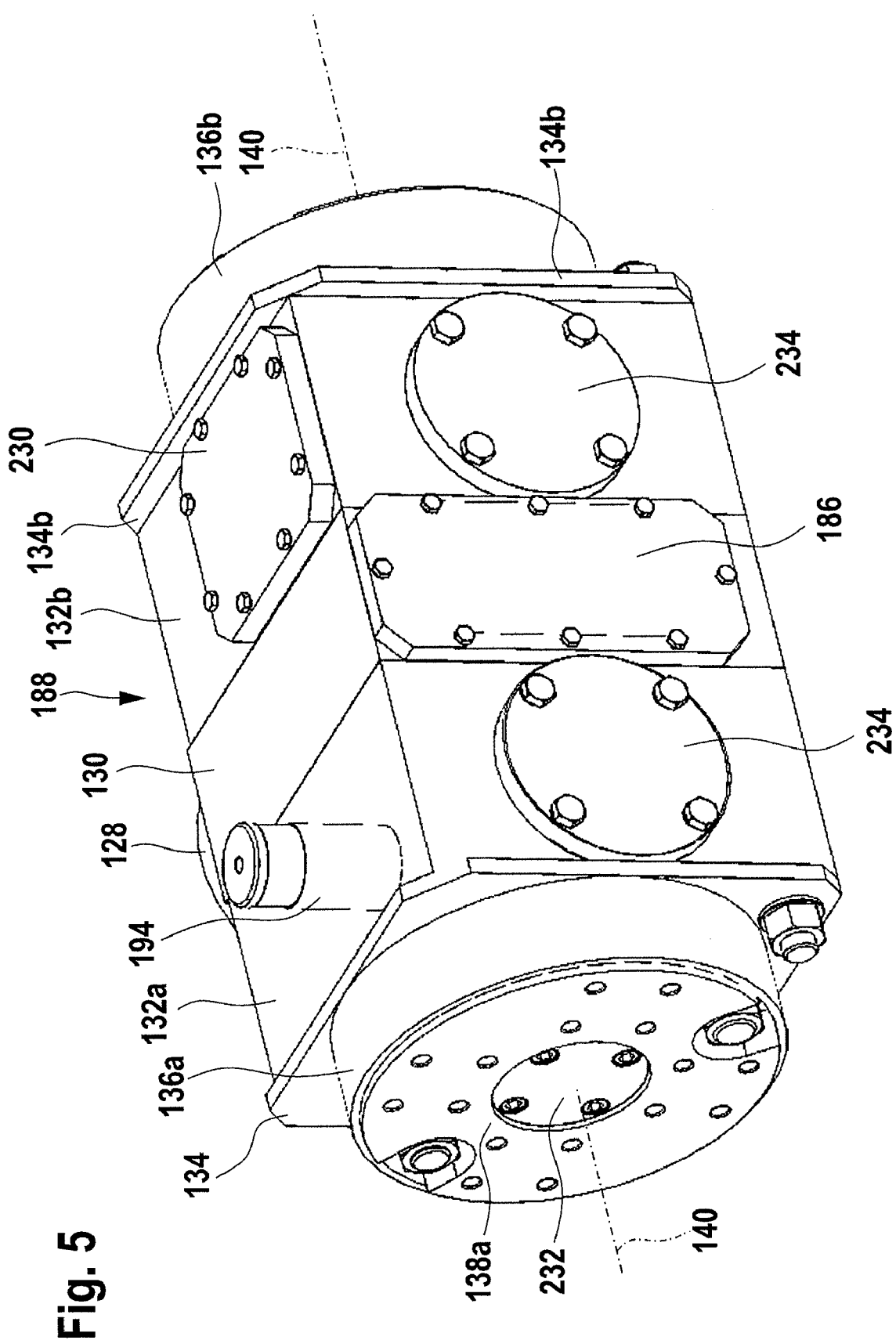
FIG. 5 a schematic perspective illustration of the gripping device with the linearly displaceable gripping elements removed.

As can best be seen from FIG. 5, the gripping device 126 comprises a substantially block-like centre section 130 which is arranged between a substantially block-like left-hand side part 132a and a substantially block-like right-hand side part 132b.

A respective end plate 134a and 134b adjoins each of the two side parts 132a, 132b and each has a respective hollow cylindrical seating 136a and 136b for a respective substantially cylindrical left-hand gripping jaw 138a and a right-hand gripping jaw 138b.

Each of the gripping jaws 138a, 138b is linearly displaceable relative to the respectively associated seating 136a, 136b in parallel with the longitudinal axis 140 of the gripping device 126, namely, by means of a linear drive 142 which will be described in more detail hereinafter.

Figure 10:
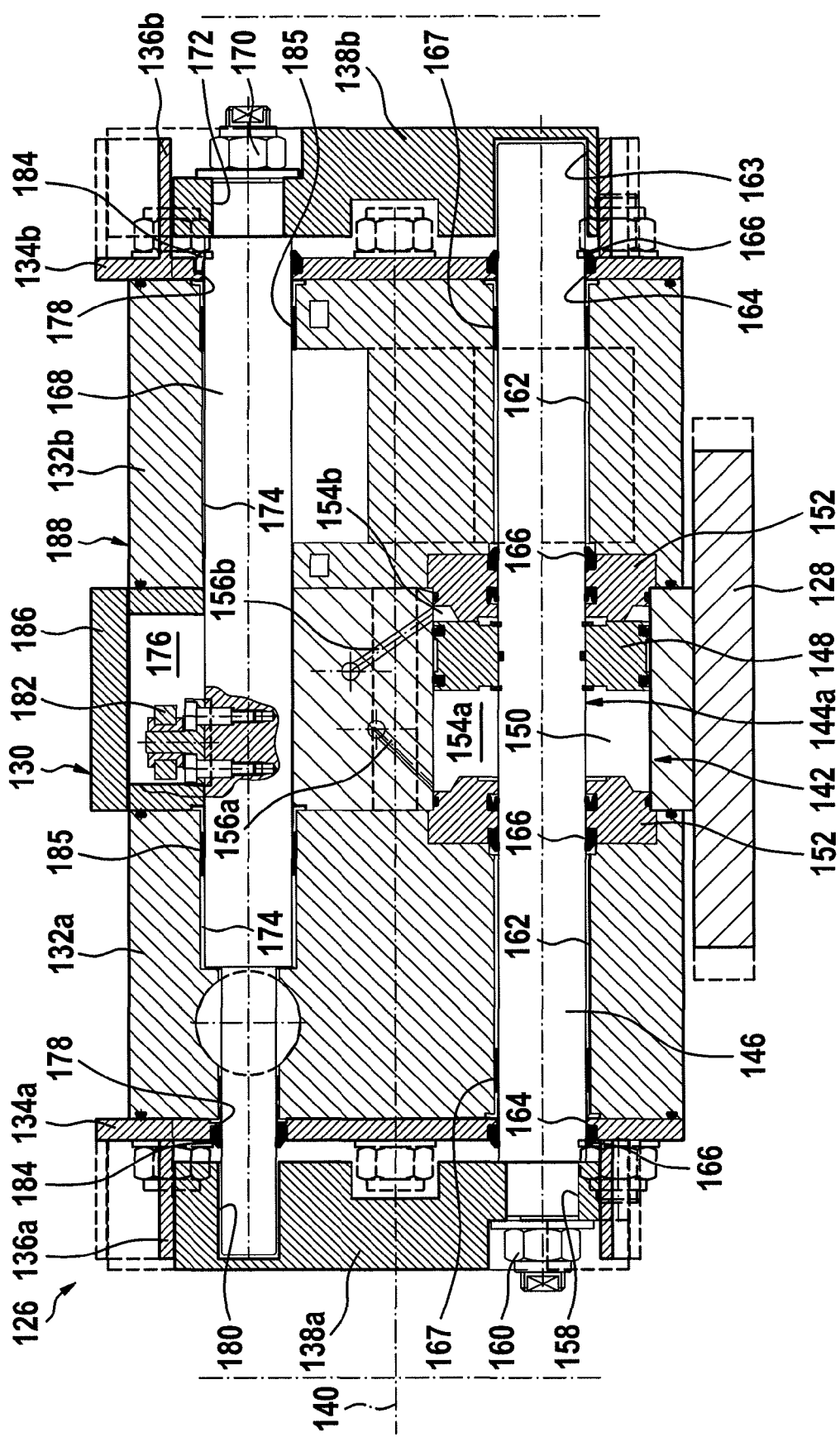
FIG. 10 a schematic horizontal longitudinal sectional view through the gripping device depicted in FIG. 9, along the line 10-10 in FIG. 9.
Figure 11:
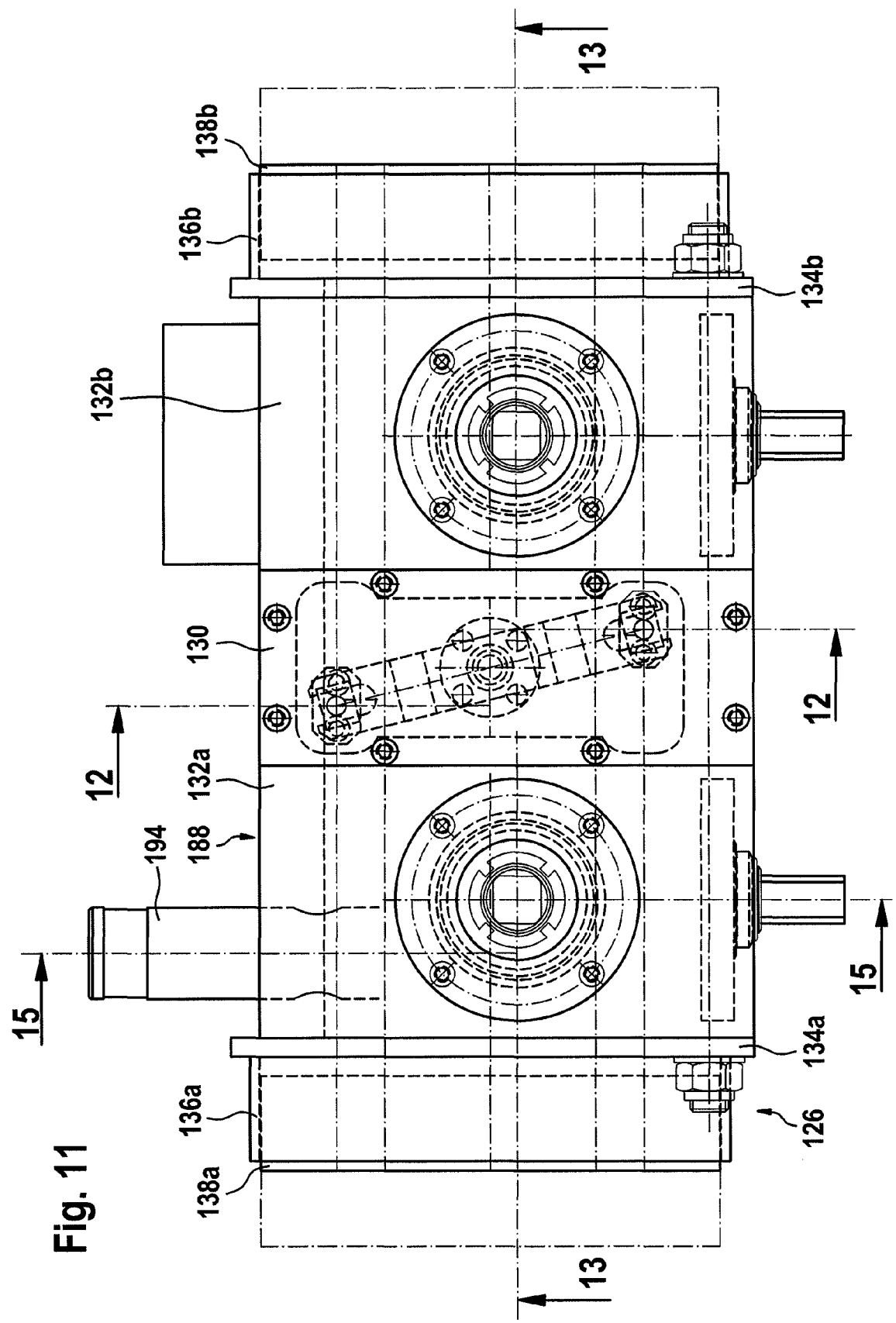
FIG. 11 a schematic front view of the gripping device depicted in FIGS. 7 to 10.

As can best be seen from FIG. 10, the linear drive 142 comprises a respective drive piston 144a, 144b for each of the linearly displaceable gripping jaws 138a, 138b, wherein each drive piston comprises a connecting rod 146 and a radially projecting collar 148 which surrounds the connecting rod 146 in ring-like manner and is arranged approximately in the centre of the connecting rod 146, and which is guided in displaceable manner in the longitudinal direction of the connecting rod 146 in a cylinder 150 provided in the centre section 130 of the gripping device 126.

Each cylinder 150 is provided at its left-hand end and its right-hand end with a respective seal packing 152 which seals the interior of the cylinder 150 in fluid-tight manner.

The interior of each cylinder 150 is sub-divided into a left-hand sub-space 154a and a right-hand sub-space 154b by the collar 148 of the respective drive piston 144a and 144b, whereby pressurised air can be supplied to the left-hand sub-space 154a by way of an air control channel 156a and pressurised air can be supplied to the right-hand sub-space 154b by way of an air control channel 156b.

Both air control channels 156a, 156b are connected to a respective (not illustrated) pneumatic line.

One end of the connecting rod 146 extends through a through opening 158 in the respective gripping jaw 138a and 138b driven by the relevant drive piston 144a and 144b and is bolted thereto by means of a nut 160.

The opposite end of the connecting rod 146 is guided in a blind bore 163 which is provided in the respectively opposite gripping jaw 138b or 138a such as to be displaceable in the longitudinal direction thereof relative to this gripping jaw 138b or 138a.

Furthermore, the connecting rod 146 extends through cylindrical channels 162 in the two side parts 132a, 132b of the gripping device 126 and through circular through openings 164 in the end plates 134a, 134b.

The connecting rod 146 is sealed against the end plates 134a, 134b and against the seal packings 152 by means of sealing rings 166, and is guided in the channels 162 by means of slide sleeves 167.

Due to the fact that the two sub-spaces 154a, 154b of the cylinder 150 are alternately subjected to compressed air, each drive piston 144a, 144b is displaced in the longitudinal direction thereof relative to the respectively associated seating 136a and 136b due to the compressive forces effective on the respective collar 148.

If, for example, the sub-space 154a illustrated to the left in FIG. 10 is subjected to compressed air, then the drive piston 144a is moved into the closed position illustrated in FIG. 10 in which the gripping jaw 138a is seated in the appertaining seating 136a.

Figure 4:
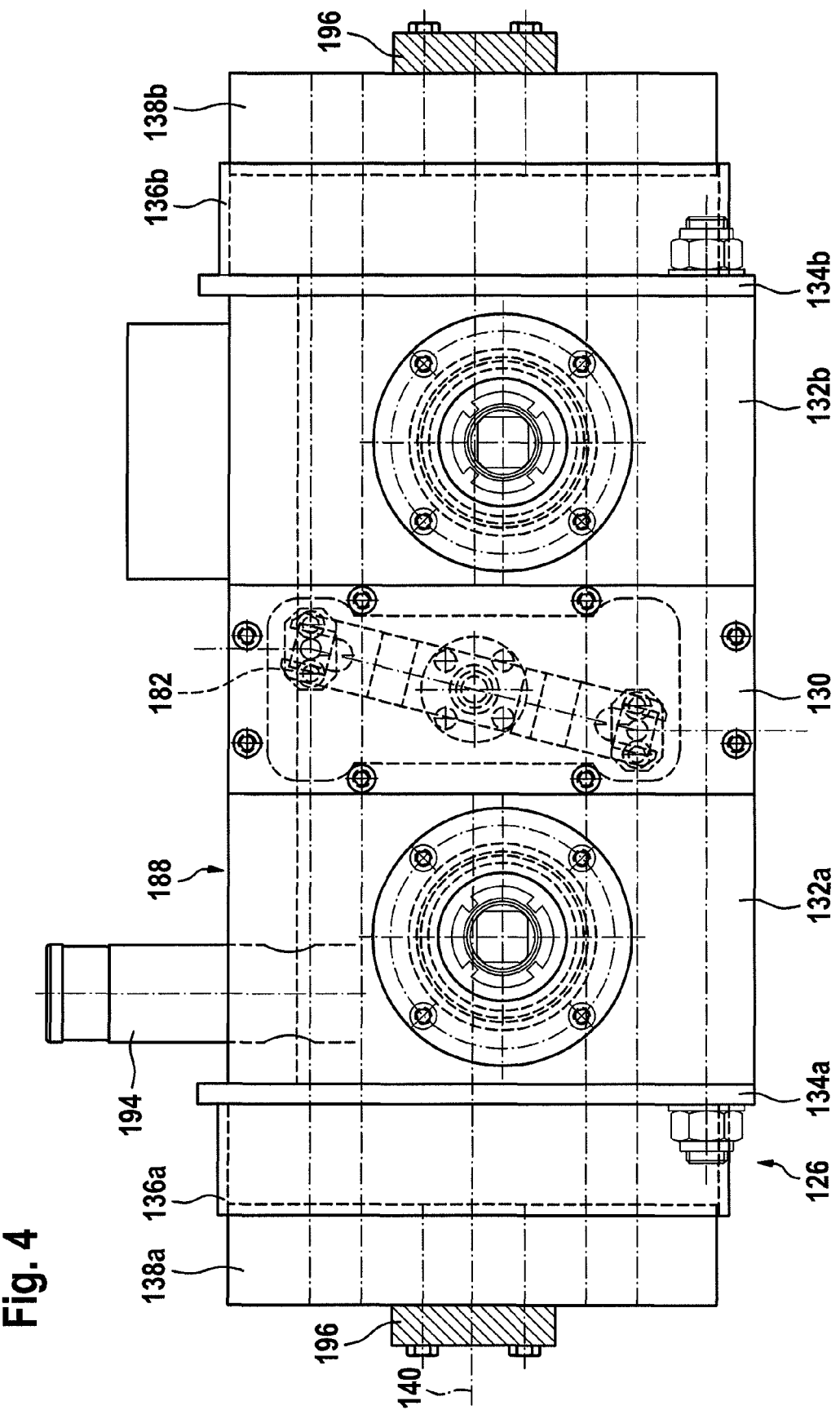
FIG. 4 a schematic front view of the gripping device corresponding to FIG. 3, wherein the linearly displaceable gripping jaws are in an open position.

If the sub-space 154b illustrated to the right in FIG. 10 is now subjected to compressed air, then the drive piston 144a is moved to the left, and the gripping jaw 138a moves from the closed position into the open position illustrated in FIG. 4 in which the gripping jaw 138a is to the most part located outside the seating 136a.

Thereby, the drive pistons 144a, 144b are subjected to compressed air in opposite senses so that the drive pistons 144a, 144b always move in parallel with each other but in opposite directions and thus the gripping jaws 138a, 138b are moved mutually synchronously into the respective closed position and into the respective open position.

Furthermore, in order to achieve the effect that the gripping jaws 138a, 138b move as accurately as possible parallel to the longitudinal axis 140 of the gripping device 126, each of the gripping jaws 138a, 138b is connected to a respective guide rod 168 which is bolted at one of the ends thereof to the respectively associated gripping jaw 138a and 138b by means of a nut 170, said guide rod extending from this end thereof through an opening 172 in the associated gripping jaw 138a, 138b, through substantially cylindrical channels 174 in the side parts 132a, 132b, through a synchronisation chamber 176 in the centre section 130 and through openings 178 in the end plates 134a, 134b, whilst the free end thereof remote from the nut 170 is guided in displaceable manner in the longitudinal direction thereof in a cylindrical blind boring 180 that is provided in the respective gripping jaw 138a and 138b which is not fixed to the associated guide rod 168 (see in particular FIG. 10).

Figure 12:
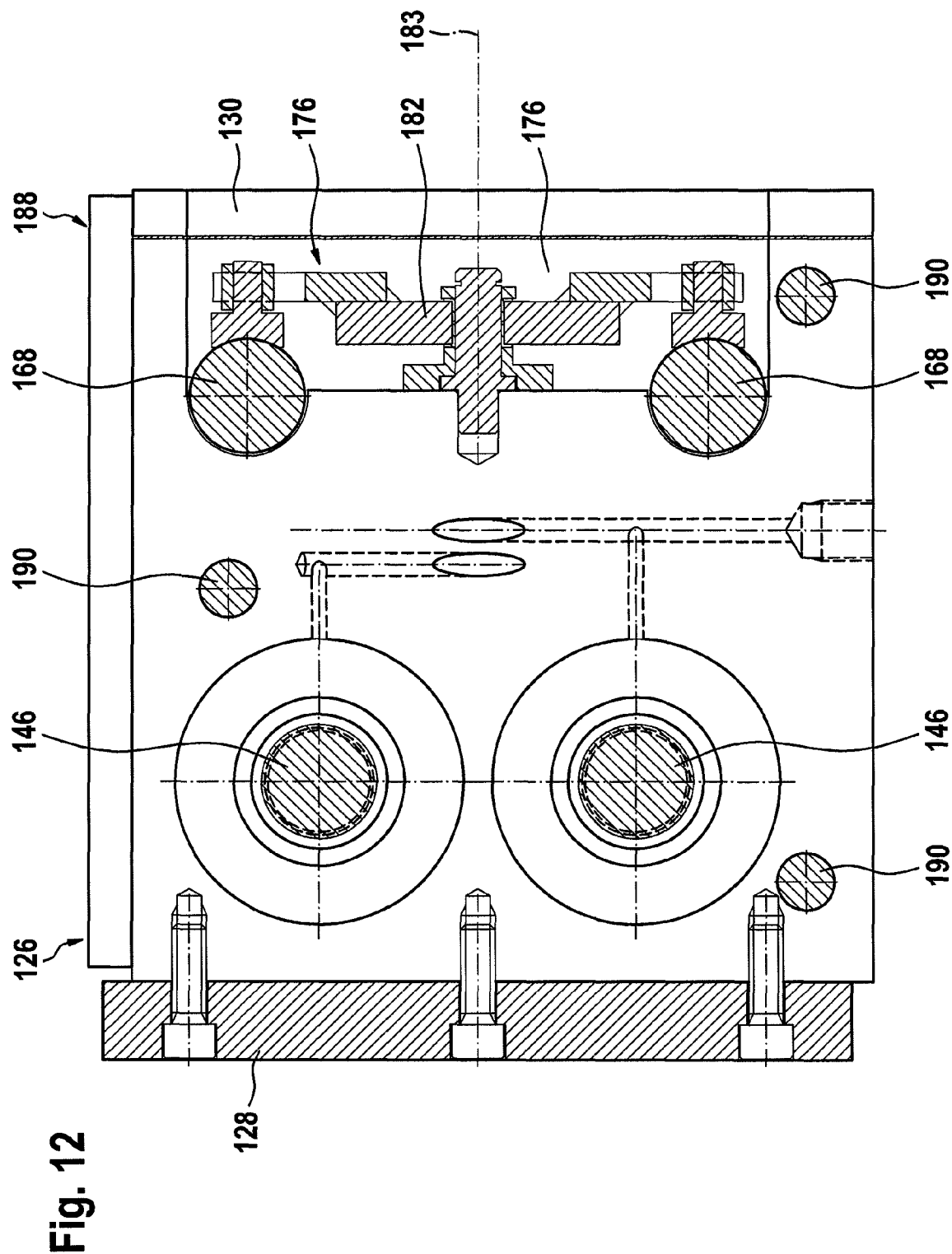
FIG. 12 a schematic vertical cross sectional view through the gripping device depicted in FIG. 11, along the line 12-12 in FIG. 11.
Figure 13:
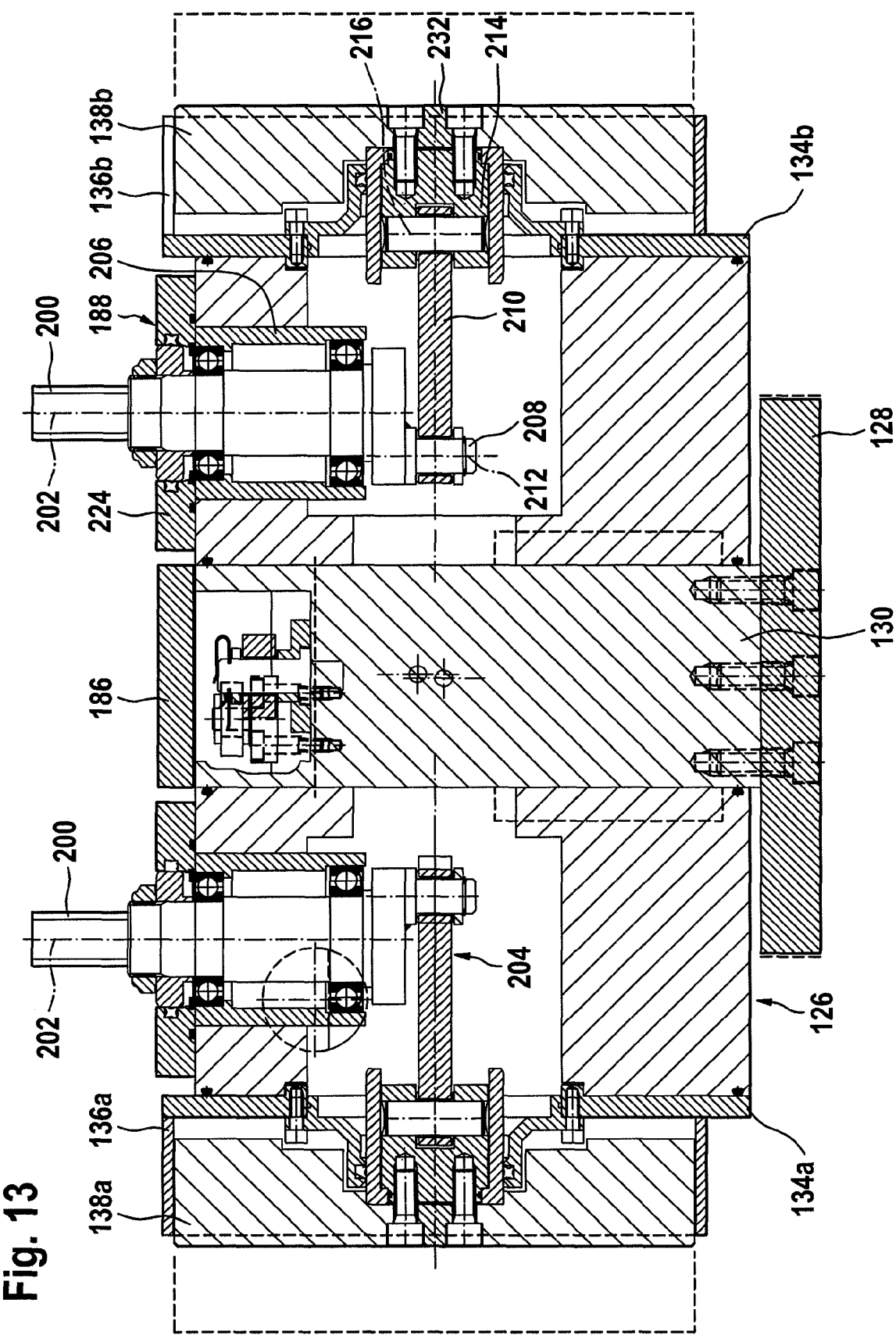
FIG. 13 a schematic horizontal longitudinal sectional view through the gripping device depicted in FIG. 11, along the line 13-13 in FIG. 11.
Figure 14:
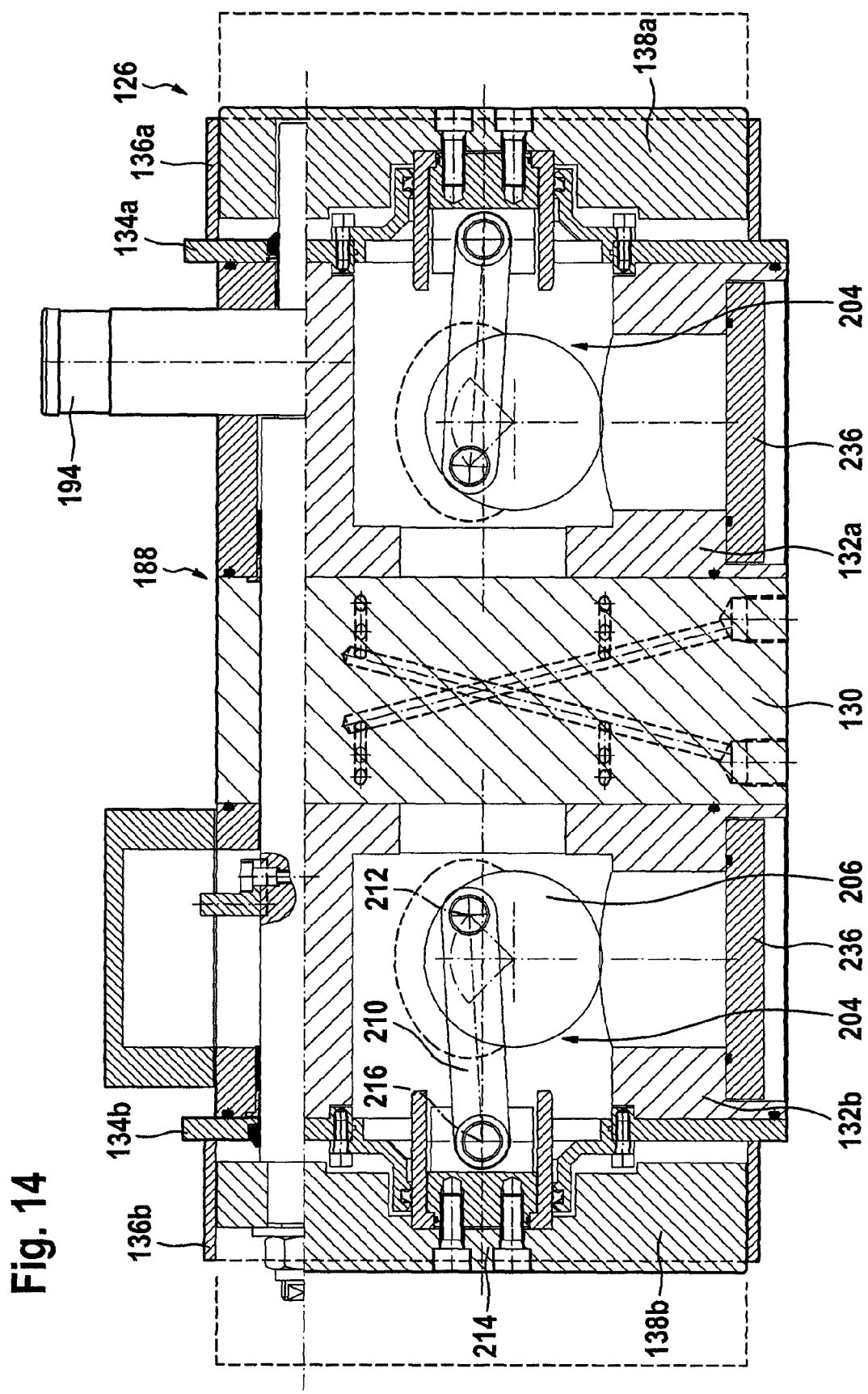
FIG. 14 a schematic vertical longitudinal sectional view through the gripping device depicted in FIG. 9, along the line 14-14 in FIG. 9.
Figure 15:
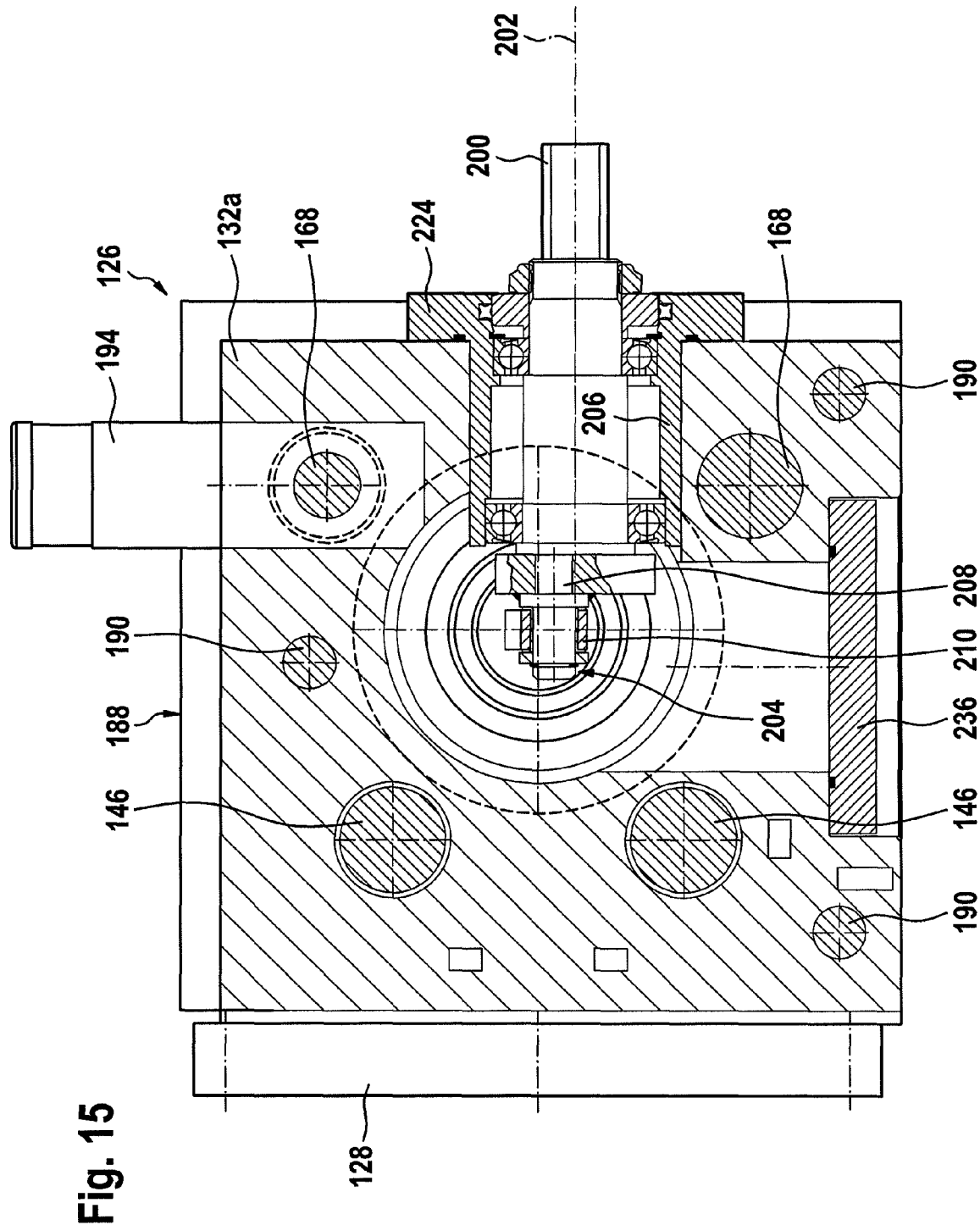
FIG. 15 a schematic vertical cross section through the gripping device depicted in FIG. 11, along the line 15-15 in FIG. 11.

The two guide rods 168 that are fixed to the respective gripping jaws 138a and 138b are connected together by means of a synchronisation member 182 which is arranged in the synchronisation chamber 176 such as to be pivotal about a pivotal axis 183 running perpendicularly to the longitudinal directions of the guide rods 168 and which is connected at the two free ends thereof to one of the guide rods 168 in articulated manner so that the two guide rods 168 can only move through equal path lengths in mutually opposite and mutually parallel directions (see in particular FIG. 12).

Due to the synchronisation member 182, it is thus ensured that the mutually oppositely directed linear movements of the gripping jaws 138a and 138b always take place exactly synchronously.

The guide rods 168 are sealed against the end plates 134a, 134b by means of sealing rings 184 and are guided in the channels 174 by means of slide sleeves 185.

The synchronisation chamber 176 is closed to the exterior of the gripping device 126 by means of a cover plate 186 which is fixed to the centre section 130 of the gripping device 126 in releasable manner by means of a suitable mounting means.

Furthermore, in order to hold together the housing 188 of the gripping device 126 that is composed of the centre section 130, the side parts 132a, 132b and the end plates 134a, 134b, there are provided a plurality of, three for example, connecting rods 190 which extend through the abovementioned components of the housing 188 and are provided at the free ends thereof with external threads onto which clamping nuts 192 are screwed in order to clamp together the end plates 134a, 134b and also the side parts 132a, 132b and the centre section 130 that are arranged between the end plates.

Furthermore, the housing 188 of the gripping device 126 is provided with a ventilation device 194 which is arranged on the upper surface of the left-hand side part 132a.

In FIGS. 1 to 4, the gripping device 126 is illustrated in a first operational state in which a gripping element 196 is fixed to the outer face of each gripping jaw 138a, 138b in releasable manner, whereby the mutually oppositely located gripping elements 196 can be moved by the linear drive 142 for the gripping jaws 138a, 138b in the direction of the longitudinal axis 140 of the gripping device 126 either towards one another into a closed position or away from each other into an open position.

Provision may be made here for the gripping elements 196 to grip a workpiece that is to be gripped in the closed position and to release it in the open position; as an alternative thereto however, the gripping elements 196 could also be formed and arranged relative to the workpiece in such a way that the workpiece is gripped in the open position of the gripping elements 196 and released in the closed position of the gripping elements 196.

In the closed position of the gripping elements 196 illustrated in FIGS. 1 and 2, the gripping elements 196 hold a workpiece 198 that is arranged therebetween and can be released by moving the gripping elements 196 into the open position.

From this first operational state, the gripping device 126 is transferable into the second operational state illustrated in FIGS. 7 to 15 by a simple structural alteration, in which, in addition to the linearly displaceable gripping jaws 138a, 138b, two pivotal gripping connections 200 are arranged at the front of the gripping device 126.

These gripping connections 200 are pivotal in mutually opposite senses about their mutually parallel pivotal axes 202 and are respectively connectable to a (not illustrated) gripping element so that these gripping elements can be moved towards one another into a closed position or away from each other into an open position by the oppositely directed pivotal movements of the gripping connections 200.

Figure 8:
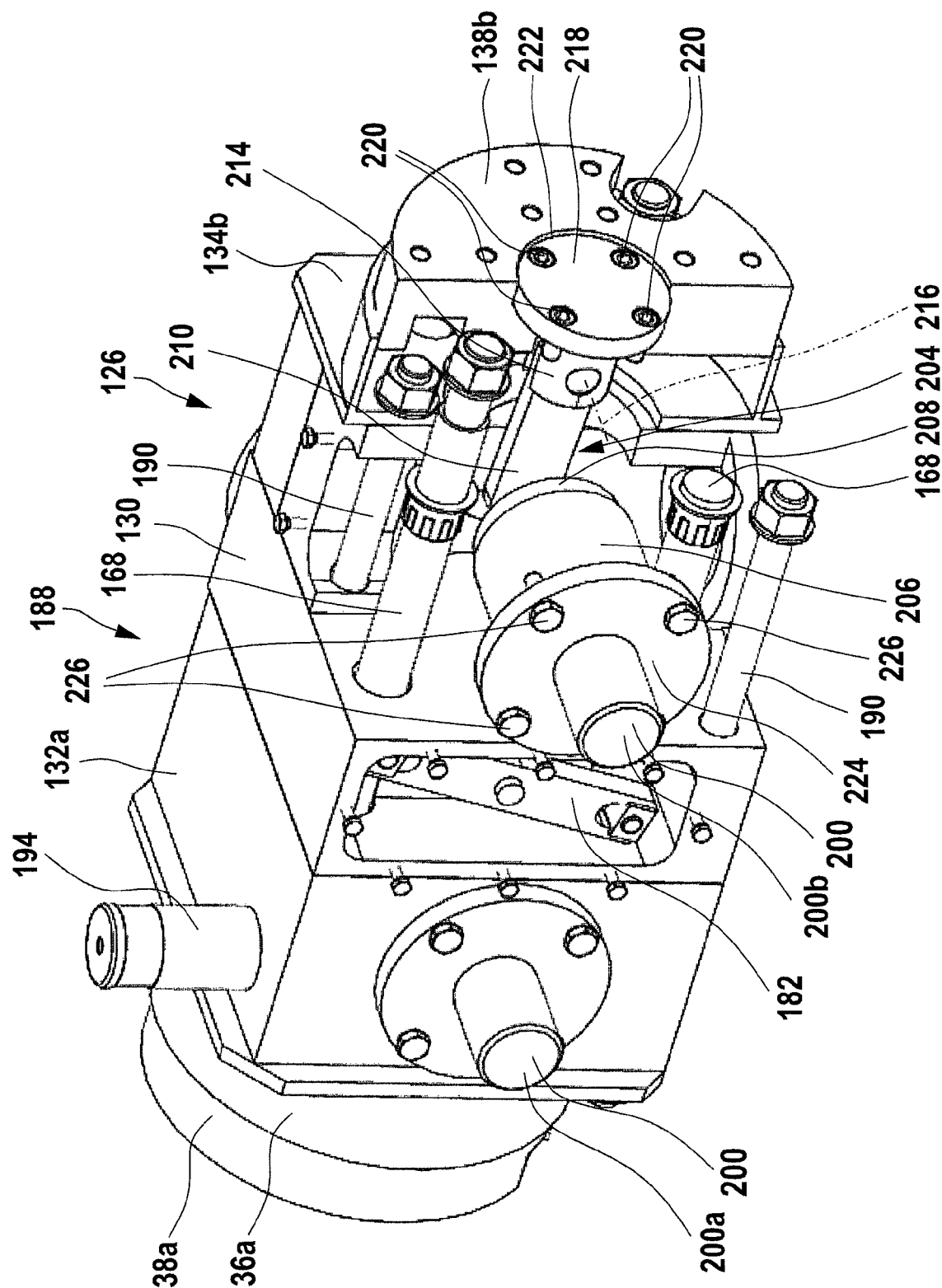
FIG. 8 a schematic perspective illustration of the gripping device depicted in FIG. 7, wherein the right-hand side part and the right-hand gripping jaw of the gripping device are partly broken away in order to render visible the elements of the gripping device that are arranged inside the side part and the gripping jaw.
Figure 9:
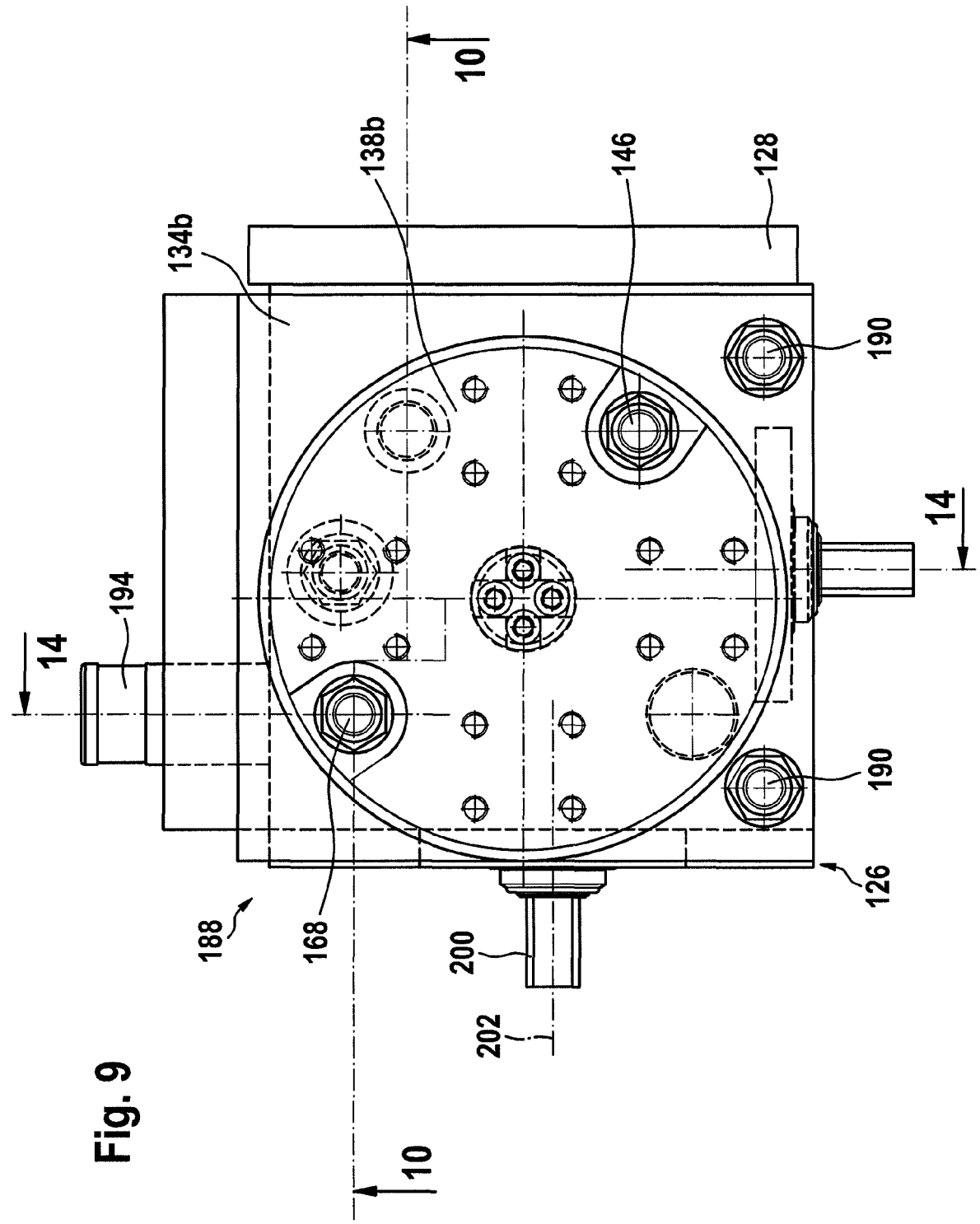
FIG. 9 a schematic side view of the gripping device depicted in FIGS. 7 and 8, in the line of sight denoted by the direction of the arrow 9 in FIG. 7.

A separate pivotal drive for producing the pivotal movement of the gripping connections 200 is not necessary; rathermore, the pivotal movement of the gripping connections 200 is derived from the linear movement of the gripping jaws 138a, 138b by means of a movement converting device 204 (see in particular FIG. 8).

Each of the movement converting devices 204 comprises a respective substantially hollow cylindrical articulated bearing 206 for the respectively associated substantially cylindrical gripping connection 200, an eccentric cam 208 connected in mutually non-rotatable manner to an end of the gripping connection 200, a connection rod 210 which is pivotal about a first pivotal axis 212 and is connected to the eccentric cam 208 at a position displaced radially outwardly with respect to the pivotal axis 202 of the gripping connection 200 and the eccentric cam 208 and which extends away from the eccentric cam 208 in a direction running perpendicularly to the pivotal axis 202, and a substantially cylindrical connecting part 214 upon which the end of the connection rod 210 remote from the eccentric cam 208 is held such as to be pivotal about a second pivotal axis 216 running parallel to the first pivotal axis 212 and which comprises a radially outwardly projecting connection flange 218 that is provided with a plurality of, for example with four, through openings for mounting means 220.

The respectively associated gripping jaw 138a and 138b each comprises a central substantially cylindrical recess 222 which accommodates the connection flange 218 in the installed state of the movement converting device 204, said flange being fixed to the associated gripping jaw 138a, 138b in releasable manner by means of the mounting means 220.

From the recess 222, the connecting part 214 extends through a through opening in the associated gripping jaw 138a, 138b into the interior of the respectively neighbouring side part 132a and 132b.

In the installed state thereof, the articulated bearing 206 of the respective movement converting device 204 extends through a through an opening in the front wall of the respectively associated side part 132a and 132b and rests externally on the front of the associated side part 132a and 132b by means of a connection flange 224 projecting from the articulated bearing 206 in the radial direction.

This connection flange 224 has a plurality of, four for example, through openings through which the mounting means 226 extend and by means of which the connection flange 224 is fixed to the associated side part 132a and 132b in releasable manner.

For the purposes of disassembling the movement converting device 204, the eccentric cam 208 can be released from the gripping connection 200 in the interior of the respectively associated side part 132a, 132b.

Subsequently, the eccentric cam 208, the connection rod 210 and the connecting part 214 can be extracted through the through opening in the respectively associated gripping jaw 138a, 138b after the attachment of the connection flange 218 to the respective gripping jaw 138a and 138b has been released.

Furthermore, the articulated bearing 206 and the gripping connection 200 that is pivotally mounted therein can be extracted through the through opening in the front wall of the respectively associated side part 132a, 132b after the attachment of the connection flange 224 to the front wall of the respective side part 132a and 132b has been released.

Assembly of the movement converting device 204 is effected by reversing the steps mentioned above for the disassembly process.

In order to enable the requisite assembly or disassembly work to be carried out in the interior of the respectively associated side part 132a, 132b, the side parts 132a, 132b are each provided with access openings 228 which are adapted to be closed by means of a respective cover plate 230 (see FIG. 5).

Figure 6:
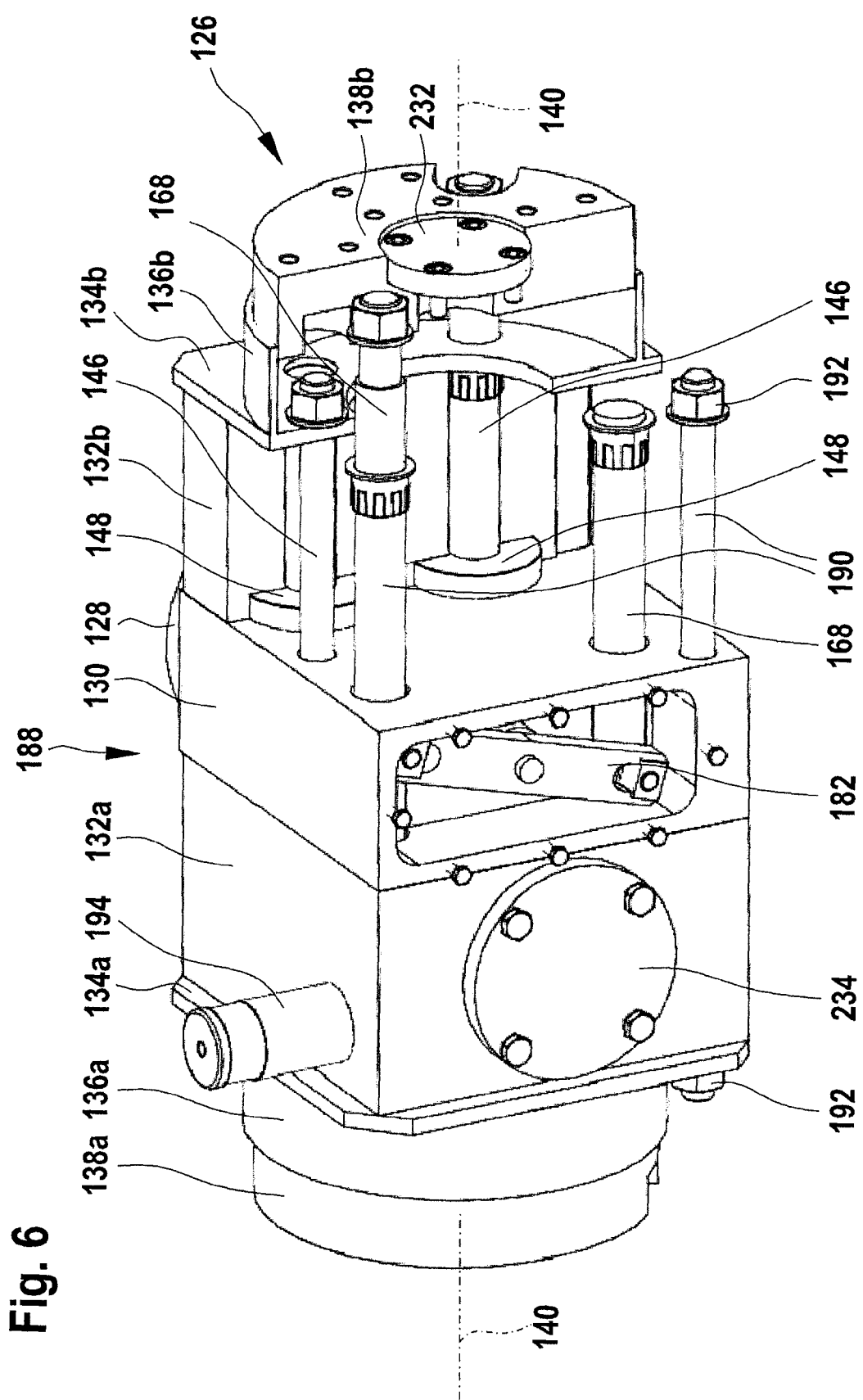
FIG. 6 a schematic perspective illustration of the gripping device depicted in FIG. 5, wherein a right-hand side part of the gripping device and a right-hand gripping jaw of the gripping device are partly broken away in order to render visible the elements of the gripping device that are arranged inside the side part and the gripping jaw.
Figure 7:
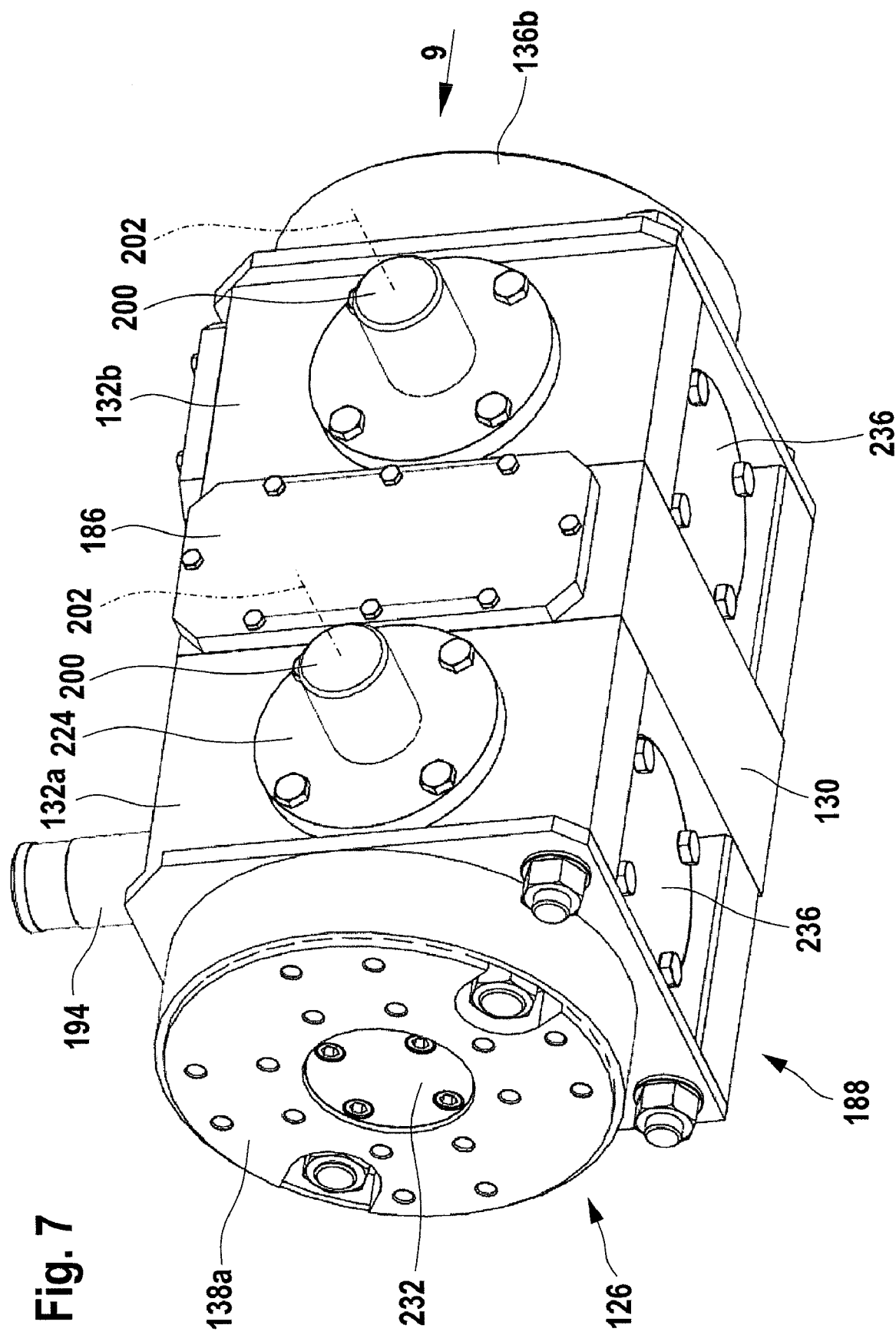
FIG. 7 a schematic perspective illustration of the gripping device in a second operational state wherein two pivotal gripping connections are arranged at the front end of the gripping device.

In the first operational state in which the movement converting devices 204 are not installed, the through openings in the gripping jaws 138a, 138b as well as in the front walls of the side parts 132a, 132b are closed by respective covers 232 and 234 which are respectively fixed to the gripping jaws 138a, 138b and to the side parts 132a, 132b in releasable manner by means of mounting means (see FIGS. 5 and 6).

In the second operational state of the gripping device 126, a pivotal movement of the gripping connections 200 is effected by a linear movement of the gripping jaws 138a, 138b by means of the movement converting devices 204 since, for example, in the course of a movement of the gripping jaws 138a, 138b along the longitudinal axis 140 into the open position, the connection-side linkage point of the connection rod 210 is moved outwardly along the longitudinal axis 140, this thereby resulting in a pivotal movement about its pivotal axis 202 of the eccentric cam 208 which is articulated to the respective other end of the connection rod 210. In consequence, the gripping connection 200 that is connected to the eccentric cam 208 in mutually non-rotatable manner is also pivoted about the pivotal axis 202.

As can be seen from FIG. 8, when the gripping jaws 138a, 138b move outwardly into the open position due to the effect of the linear drive 142, the right-hand gripping connection 200b (as seen from the front of the gripping device 126) is then pivoted in the clockwise direction and the left-hand gripping connection 200 in the counter clockwise direction.

The (not illustrated) gripping elements, which are connected to the gripping connections 200, likewise implement a pivotal movement due to the pivotal movement of the gripping connections 200, whereby this pivotal movement can lead up to a closed position or an open position of the gripping elements in dependence on the design of the gripping elements and depending upon their arrangement on the gripping connections 200.

Thus, the movement of the gripping jaws 138a, 138b into the open position can correspond to a movement of the gripping elements on the gripping connections 200 into an open position or into a closed position.

Conversely, a movement of the gripping jaws 138a, 138b into the closed position can correspond to a movement of the gripping elements arranged on the gripping connections 200 into a closed position or into an open position.

Figure 16:
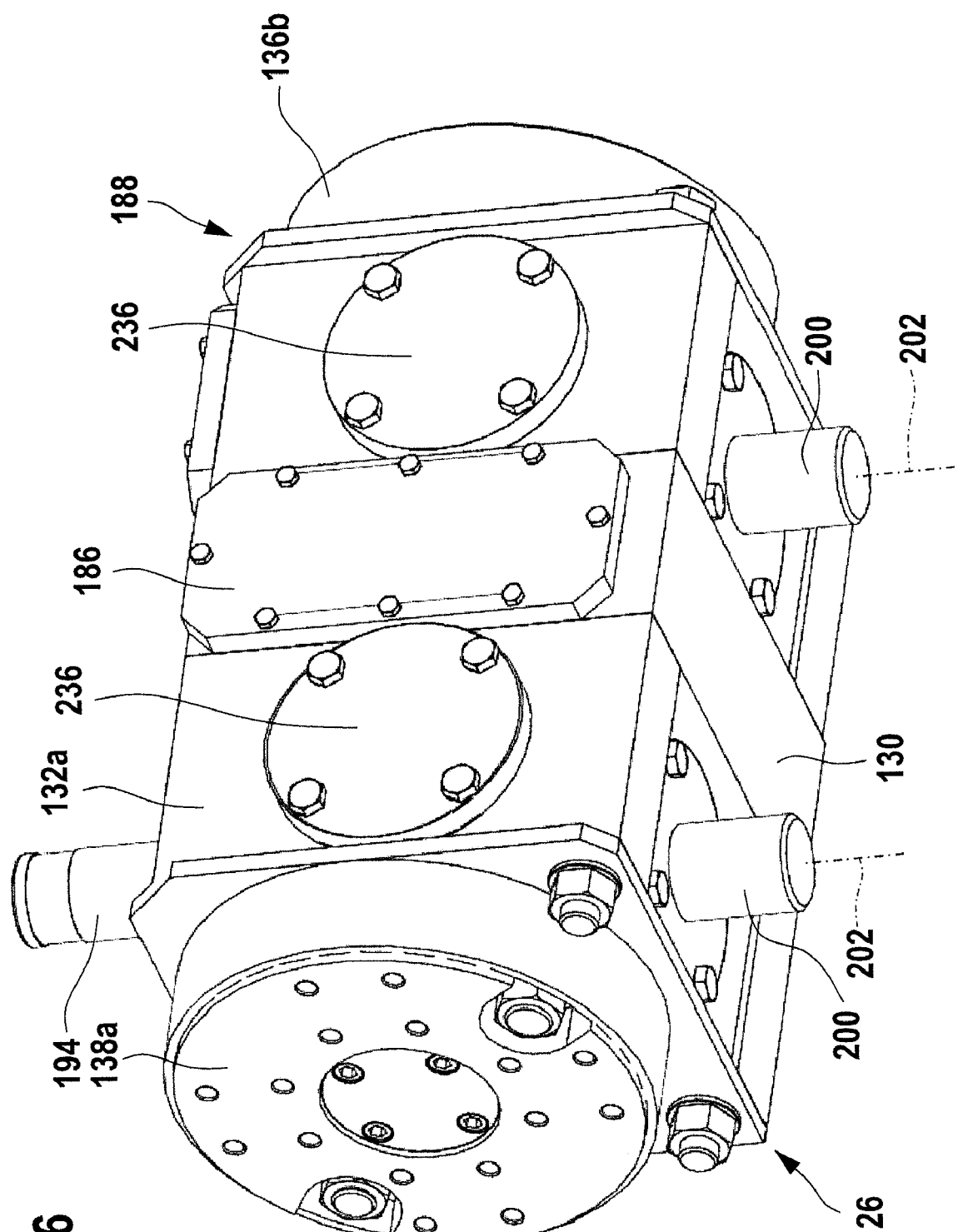
FIG. 16 a schematic perspective illustration of the gripping device in a third operational state in which two pivotal gripping connections are arranged on a lower surface of the gripping device.
Figure 17:
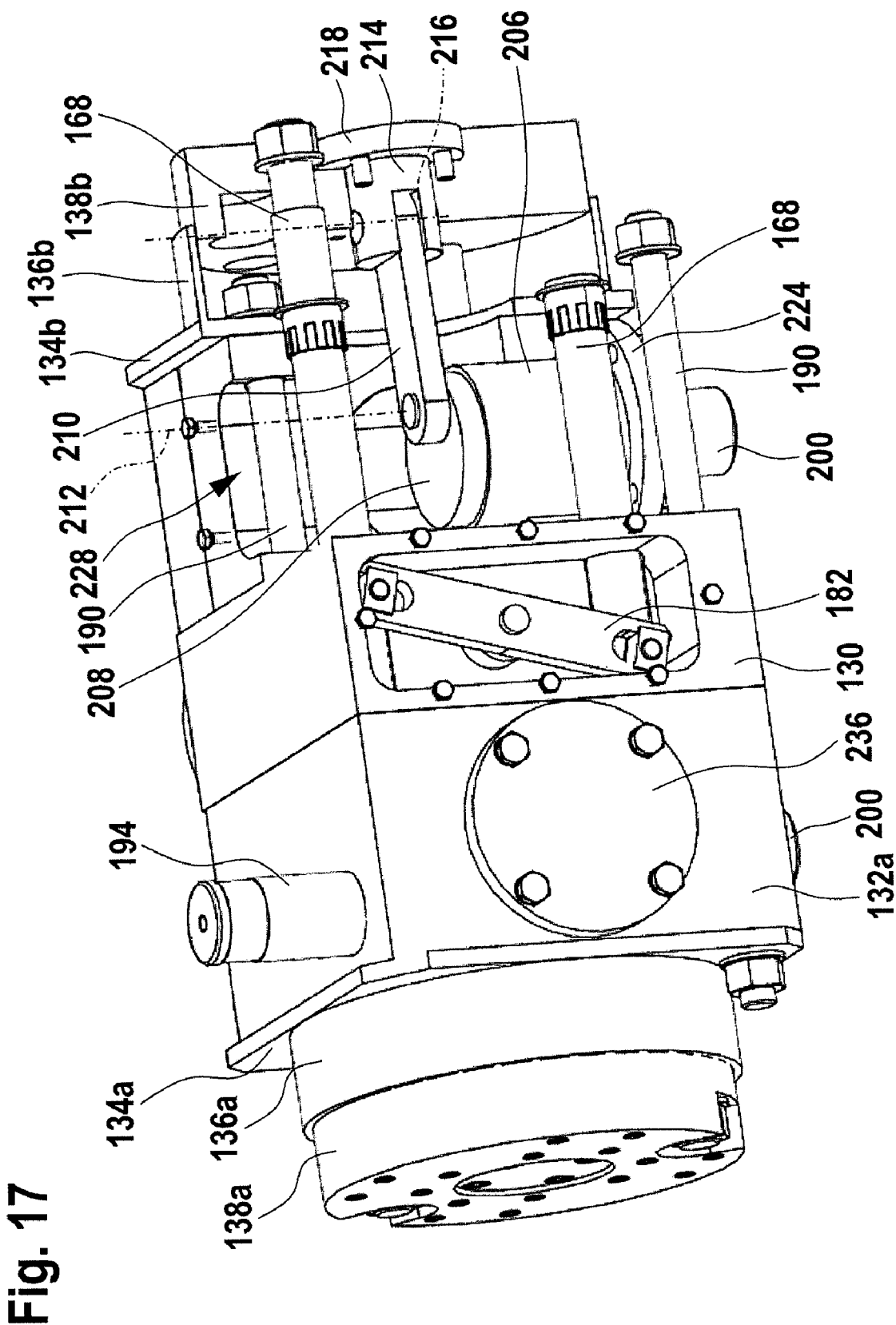
FIG. 17 a schematic perspective illustration of the gripping device depicted in FIG. 16, wherein the right-hand side part and the right-hand linearly displaceable gripping jaw of the gripping device are partly broken away in order to render visible the elements of the gripping device that are arranged inside the side part and the gripping jaw.

The third operational state of the gripping device 126 illustrated in FIGS. 16 and 17 differs from the second operational state illustrated in FIGS. 7 to 15 only in that the gripping connections 200 are not arranged on the front face of the gripping device 126, but instead, on the lower surface thereof, i.e. at a position rotated through 90° relative to the second operational state.

In order to be able to use this third operational state of the gripping device 126, the bottom walls of the side parts 132a, 132b are likewise provided with through openings for the articulated bearings 206 of the movement converting devices 204 as is the case for their front walls.

In the first operational state and in the second operational state, these lower through openings are closed by covers 236 (see FIG. 7) which are fixed to the bottom wall of the side parts 132a, 132b in releasable manner by means of mounting means.

In order to transfer the gripping device 126 from the second operational state into the third operational state, the movement converting devices 204 need only be rotated through an angle of 90° relative to the housing 188 of the gripping device 126.

To this end, it is only necessary to release the connection between the eccentric cam 208 and the respectively associated gripping connection 200, to extract the articulated bearing 206 with the gripping connection 200 through the opening in the front face of the respective side part 132a and 132b, to close this opening by means of the cover 234, to release the connection flange 218 of the connecting part 214 from the respective gripping jaw 138a, 138b, to rotate it through an angle of 90° and fix it again to the associated gripping jaw 138a or 138b in releasable manner when in the rotated position, to release the cover 236 from the opening in the bottom wall of the respective side part 132a and 132b, to feed the articulated bearing 206 with the gripping connection 200 through the thus freed opening and then to re-establish the connection of the eccentric cam 208 to the gripping connection 200 in this new position.

After carrying out this conversion work, a pivotal movement of the gripping connections 200 that are now arranged on the lower surface of the gripping device 126 can be derived in the same way by means of the movement converting devices 204 from the linear movement of the gripping jaws 138a, 138b as has already been described hereinabove in connection with the second operational state of the gripping device 126.

The invention claimed is:

1. A gripping device for a robot or a gantry loader comprising at least one linearly displaceable gripping jaw and at least one pivotal gripping connection,
   wherein the pivotal gripping connection can be arranged in at least one first position and in at least one second position relative to a housing of the gripping device; and
   wherein the housing of the gripping device comprises a first through opening for the passage of the pivotal gripping connection in the first position and a second through opening for the passage of the pivotal gripping connecting in the second position.

2. A gripping device in accordance with claim 1, wherein the gripping device comprises a linear drive for the at least one linearly displaceable gripping jaw.

3. A gripping device in accordance with claim 2, wherein the linear drive comprises at least one linearly displaceable actuating rod which engages the linearly displaceable gripping jaw.

4. A gripping device in accordance with claim 3, wherein the linear drive comprises at least one drive piston which is displaceable in a drive cylinder by the effect of a hydraulic or pneumatic pressure.

5. A gripping device in accordance with claim 2, wherein the linear drive comprises at least one guide rod for controlling the linear movement of the linearly displaceable gripping jaw.

6. A gripping device in accordance with claim 2, wherein the gripping device comprises at least two linearly displaceable gripping jaws and a synchronization member for synchronizing the linear movement of the linearly displaceable gripping jaws.

7. A gripping device in accordance with claim 1, wherein the gripping device comprises a pivotal drive for the at least one pivotal gripping connection.

8. A gripping device in accordance with claim 7, wherein the pivotal drive comprises at least one movement converting device which converts the linear movement of the at least one linearly displaceable gripping jaw into a pivotal movement of the at least one pivotal gripping connection about a pivotal axis.

9. A gripping device in accordance with claim 8, wherein the movement converting device is connected to the linearly displaceable gripping jaw.

10. A gripping device in accordance with claim 9, wherein the movement converting device is connected to the linearly displaceable gripping jaw in releasable manner.

11. A gripping device in accordance with claim 8, wherein the movement converting device can be selectively arranged in at least one first position and at least one second position relative to the linearly displaceable gripping jaw, wherein, in the second position of the movement converting device, the direction of the pivotal axis, about which the pivotal gripping connection is pivoted by means of the movement converting device, is rotated with respect to the direction of the pivotal axis in the first position of the movement converting device.

12. A gripping device in accordance with claim 11, wherein the direction of the pivotal axis in the second position of the movement converting device is rotated through an angle of approximately 90 degree. with respect to the direction of the pivotal axis in the first position of the movement converting device.

13. A gripping device in accordance with claim 8, wherein the movement converting device comprises a connecting rod.

14. A gripping device in accordance claim 8, wherein the movement converting device comprises an eccentric cam.

15. A gripping device in accordance claim 8, wherein the movement converting device comprises an articulated bearing for the pivotal gripping connection.

16. A gripping device in accordance with claim 1, wherein the gripping device comprises a cover for closing the first through opening or the second through opening when the pivotal gripping connection is arranged at the second through opening or at the first through opening respectively.

* * * * *